(12) United States Patent
Seto et al.

(10) Patent No.: US 9,604,424 B2
(45) Date of Patent: Mar. 28, 2017

(54) METHOD OF MANUFACTURING PNEUMATIC TIRE

(75) Inventors: Hideki Seto, Hiratsuka (JP); Yuichi Hara, Hiratsuka (JP); Hirokazu Shibata, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 33 days.

(21) Appl. No.: 14/367,726

(22) PCT Filed: Aug. 8, 2012

(86) PCT No.: PCT/JP2012/070229
§ 371 (c)(1),
(2), (4) Date: Jun. 20, 2014

(87) PCT Pub. No.: WO2013/094247
PCT Pub. Date: Jun. 27, 2013

(65) Prior Publication Data
US 2015/0321433 A1    Nov. 12, 2015

(30) Foreign Application Priority Data

Dec. 22, 2011   (JP) .................................. 2011-281836

(51) Int. Cl.
*B29D 30/06*    (2006.01)
*B29D 30/30*    (2006.01)
(Continued)

(52) U.S. Cl.
CPC ......... *B29D 30/3042* (2013.01); *B26D 3/003* (2013.01); *B26F 3/08* (2013.01);
(Continued)

(58) Field of Classification Search
CPC ............ B29D 30/0005; B29D 30/0662; B29D 30/0681; B29D 2030/0682; B29D 3/003;
(Continued)

(56) References Cited

U.S. PATENT DOCUMENTS 3,064,111 A * 11/1962 Newman .................. B26F 3/12
  144/3.1
3,245,294 A * 4/1966 Butter ....................... B26F 3/06
  219/233

(Continued)

FOREIGN PATENT DOCUMENTS

JP    H08-132553    5/1996
JP    2001-232696   8/2001
(Continued)

OTHER PUBLICATIONS

Machine generated English language translation of JP 2009-190448 (original document dated Aug. 2009).*

(Continued)

*Primary Examiner* — Martin Rogers
(74) *Attorney, Agent, or Firm* — Thorpe North & Western

(57) ABSTRACT

The present technology provides a method of manufacturing a pneumatic tire. The method of manufacturing a pneumatic tire uses a laminated sheet having a predetermined length and an inner liner layer formed from the laminated sheet through a step of cure-molding the tire with end portions of the laminated sheet lap-spliced. In the method, when at least the sheet made of thermoplastic resin or a thermoplastic resin composition obtained by blending the thermoplastic resin and the elastomer is cut into the predetermined length, the cutting is performed by using an edge tool having a non-sharp edge under a temperature condition not lower than 60° C. and not higher than a melting point of the thermoplastic resin.

4 Claims, 5 Drawing Sheets

(51) Int. Cl.
*B26D 3/00* (2006.01)
*B26F 3/08* (2006.01)
*B26D 1/00* (2006.01)

(52) U.S. Cl.
CPC .. *B29D 30/0681* (2013.01); *B26D 2001/0053* (2013.01); *B26D 2001/0086* (2013.01); *B29D 2030/0682* (2013.01); *B60C 2005/145* (2013.04); *B60C 2005/147* (2013.04)

(58) Field of Classification Search
CPC ............... B26F 3/08; B26D 2001/0086; B60C 2005/145; B60C 2005/147
See application file for complete search history.

(56) References Cited

U.S. PATENT DOCUMENTS

| | | | | |
|---|---|---|---|---|
| 3,977,173 A | * | 8/1976 | Kosaka | D02G 1/0253 57/205 |
| 4,426,901 A | * | 1/1984 | Hogan | B26D 5/12 225/101 |
| 5,438,758 A | * | 8/1995 | Roth-White | B26B 3/00 219/228 |
| 5,711,935 A | * | 1/1998 | Hill | A61C 15/042 132/321 |
| 5,894,775 A | * | 4/1999 | Brash | B26D 1/22 83/168 |
| 5,967,015 A | * | 10/1999 | Grebe | B26D 1/0006 83/684 |
| 5,992,486 A | * | 11/1999 | Katsuki | B60C 1/0008 152/510 |
| 6,066,226 A | * | 5/2000 | Nagata | B29C 65/08 156/251 |
| 2003/0056875 A1 | * | 3/2003 | Wright | B29D 30/20 156/110.1 |
| 2003/0213542 A1 | * | 11/2003 | Kobayashi | B60C 9/08 152/517 |
| 2008/0041206 A1 | * | 2/2008 | Mergola | B26F 1/44 83/343 |
| 2008/0115638 A1 | * | 5/2008 | Nalle | B26D 7/10 83/16 |
| 2009/0131592 A1 | * | 5/2009 | Sakai | B32B 25/08 525/190 |
| 2010/0193098 A1 | * | 8/2010 | Kirino | C08L 15/00 152/450 |

FOREIGN PATENT DOCUMENTS

| | | | | |
|---|---|---|---|---|
| JP | 2002-103908 | | 4/2002 | |
| JP | 2003-225890 | * | 8/2003 | ............... B26D 7/10 |
| JP | 2005-238759 | * | 9/2005 | ............. B26D 30/30 |
| JP | 2006-15437 | * | 1/2006 | ............... B26F 3/08 |
| JP | 2007-22020 | * | 2/2007 | ............. B29D 30/08 |
| JP | 2009-190448 | * | 8/2009 | ............... B60C 5/14 |
| JP | 2009-241855 | * | 10/2009 | ............... B60C 5/14 |

OTHER PUBLICATIONS

Machine generated English language translation of JP 2009-241855 (original document dated Oct. 2009).*
Machine generated English language translation of JP 2006-15437 (original document dated Jan. 2006).*
Machine generated English language translation of JP 2003-225890 (original document dated Aug. 2003).*
Machine generated English language translation of JP 2005-238759 (original document dated Sep. 2005).*
Machine generated English language translation of JP 2007-22020 (original document dated Feb. 2007).*

* cited by examiner

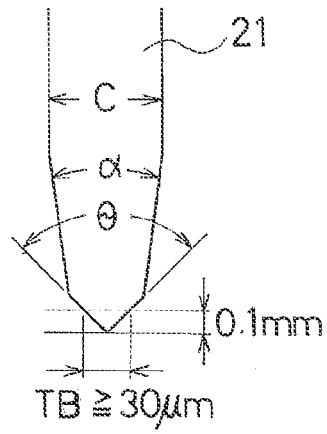
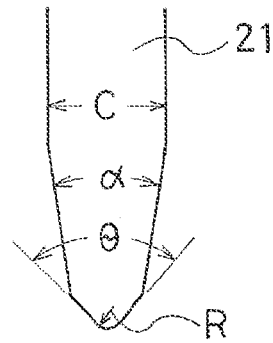
FIG. 4A
FIG. 4B
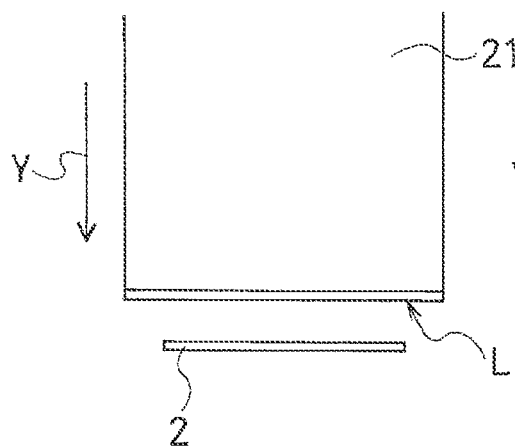
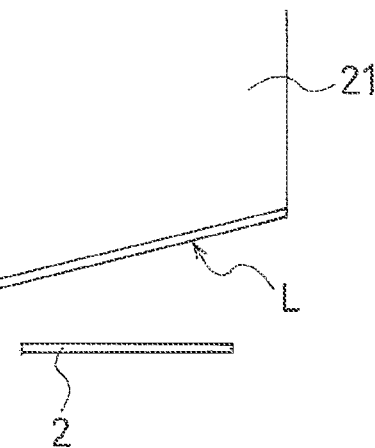
FIG. 4C
FIG. 4D

METHOD OF MANUFACTURING PNEUMATIC TIRE

TECHNICAL FIELD

The present technology relates to a method of manufacturing a pneumatic tire.

More specifically, the present technology relates to a method of manufacturing a pneumatic tire which uses a laminated sheet having a predetermined length and obtained by laminating: a sheet made of a thermoplastic resin or a thermoplastic resin composition obtained by blending a thermoplastic resin and an elastomer; and rubber cured and adhered to the thermoplastic resin or the thermoplastic resin composition, and in which an inner liner layer is formed from the laminated sheet through a step of cure-molding the tire with end portions of the laminated sheet lap-spliced. By the method, a pneumatic tire is manufactured in which no crack develops around a splice portion of the spliced laminated sheet (inner liner layer) after the pneumatic tire starts to be used for running and which is thereby excellent in durability.

BACKGROUND ART

In recent years, proposals and studies have been made to use a sheet-shaped object made of a thermoplastic resin or a thermoplastic resin composition obtained by blending a thermoplastic resin and an elastomer, as an inner liner for a pneumatic tire (see Japanese patent application publication no. 2009-241855).

For actual use of the sheet-shaped object made of the thermal plastic resin or the thermoplastic resin composition obtained by blending the thermoplastic resin and the elastomer as the inner liner for the pneumatic tire, a manufacturing method is generally employed in which the laminated sheet including: the sheet made of the thermal plastic resin or the thermoplastic resin composition obtained by blending the thermoplastic resin and the elastomer; and the rubber (tie rubber) sheet cured and adhered to the sheet of the thermal plastic resin or the thermoplastic resin composition obtained by blending the thermoplastic resin and the elastomer is wound around a tire making drum and lap-spliced and is then subjected to step of cure-molding.

Consider, however, a case where a tire is manufactured by: winding the laminated sheet, which is made of the thermoplastic resin or the thermoplastic resin composition obtained by blending the thermoplastic resin and the elastomer and the tie rubber layer and which has been wound into a rolled shape, is pulled out and cut from the rolled shape by a desired length, around the tire making drum; lap-splicing the laminated sheet on the drum or the like; and then cure-molding the lap-spliced sheet. In this case, after the tire starts to be used for running, delamination may occur between the sheet of the thermoplastic resin or the thermoplastic resin composition and the tie rubber sheet cured and adhered to the sheet of the thermoplastic resin or the thermoplastic resin composition, which collectively constitute the inner liner.

To explain this with drawings, as shown in Part (a) of FIG. 2, a laminated sheet 1 including: a sheet 2 made of a thermoplastic resin or a thermoplastic resin composition obtained by blending a thermoplastic resin and an elastomer; and a tie rubber layer 3 is cut into a predetermined size (length) with an edge tool, for example. Then, both end portions of the laminated sheet 1 are overlapped with each other and lap-spliced on a tire making drum in such a way that a lap-splice portion S is provided and the laminated sheet 1 forms an annular shape.

Incidentally, when one laminated sheet 1 is used, both end portions thereof are spliced in such a way that laminated sheet 1 forms an annular shape. Meanwhile, when a plurality of laminated sheets 1 are used, both end portions of each of the laminated sheets 1 are spliced in such a way that the laminated sheets 1 form one annular shape as a whole. The cutting to the predetermined size may be performed in the state of the laminated sheet 1 obtained by laminating: the sheet 2 made of the thermoplastic resin or the thermoplastic resin composition obtained by blending the thermoplastic resin and the elastomer; and the tie rubber layer 3. Alternatively, the cutting may be performed in such a way that the sheet 2 and the tie rubber layer 3 are cut separately and thereafter laminated.

Then, other parts (not illustrated) necessary for manufacturing the tire are wound and a green tire is thereby formed. Thereafter, cure-molding is performed with a bladder.

As a result of the cure-molding, an inner liner layer 10 is formed which includes: the sheet 2 of the thermoplastic resin or the thermoplastic resin composition obtained by blending the thermoplastic resin and the elastomer; and the tie rubber layer 3, as shown in the view in Part (b) of FIG. 2 as a model. Around the splice portion S formed by overlapping, there are formed a portion where the sheet 2 made of the thermoplastic resin or the thermoplastic resin composition is exposed and a portion where the sheet 2 is buried inside the tie rubber layer.

The phenomenon of delamination between the sheet 2 of the thermoplastic resin or the thermoplastic resin composition and the tie rubber sheet 3 cured and adhered thereto occurs particularly in a vicinity 4 of the tip portion or the like of the sheet 2, at a spot shown in Part (b) of FIG. 2 where the sheet 2 of the thermoplastic resin or the thermoplastic resin composition is exposed. In the beginning, a crack develops, and then grows into the sheet delamination phenomenon.

SUMMARY

The present technology provides a method of manufacturing a pneumatic tire which uses a laminated sheet obtained by cutting, to a predetermined length, a laminated sheet obtained by laminating: a sheet made of a thermoplastic resin or a thermoplastic resin composition obtained by blending a thermoplastic resin and an elastomer; and rubber cured and adhered to the thermoplastic resin or the thermoplastic resin composition, or which uses a laminated sheet obtained by cutting, to a predetermined length, each of: a sheet made of a thermoplastic resin or a thermoplastic resin composition obtained by blending a thermoplastic resin and an elastomer; and rubber to be cured and adhered to the thermoplastic resin or the thermoplastic resin composition and then laminating the sheet and the rubber, and in which an inner liner layer is formed from the laminated sheet through steps of lap-splicing end portions of the laminated sheet and cure-molding the tire with the end portions lap-spliced, the method manufacturing a pneumatic tire in which no crack develops around a splice portion of the spliced laminated sheet (inner liner layer) described above after the pneumatic tire starts to be used for running and which is thereby excellent in durability.

A method of manufacturing a pneumatic tire of the present technology includes the following configuration (1).

(1) A method of manufacturing a pneumatic tire which uses a laminated sheet having a predetermined length and obtained by laminating: a sheet made of a thermoplastic resin or a thermoplastic resin composition obtained by blending a thermoplastic resin and an elastomer; and rubber cured and adhered to the thermoplastic resin or the thermoplastic resin composition, and in which an inner liner layer is formed from the laminated sheet through a step of cure-molding the tire with end portions of the laminated sheet lap-spliced, the method characterized in that when at least the sheet made of the thermoplastic resin or the thermoplastic resin composition obtained by blending the thermoplastic resin and the elastomer is cut into the predetermined length, the cutting is performed by using an edge tool having a non-sharp edge under a temperature condition not lower than 60° C. and not higher than a melting point of the thermoplastic resin.

The method of manufacturing a pneumatic tire of the present technology further preferably includes any of the following configurations (2) to (5).

(2) The method of manufacturing a pneumatic tire according to (1), characterized in that, in the procedure of cutting the sheet by using the edge tool having the non-sharp edge, the cutting is performed by bringing the edge tool in contact with a surface of the sheet from a direction perpendicular to the surface of the sheet.

(3) The method of manufacturing a pneumatic tire according to (1) or (2), characterized in that an edge tool having such a non-sharp edge that a thickness of a blade at a position 0.1 mm away from a tip of the blade is not less than 30 μm is used as the edge tool.

(4) The method of manufacturing a pneumatic tire according to (1) or (2), characterized in that an edge tool having such a non-sharp edge that a tip portion of the blade has a curvature is used as the edge tool.

(5) The method of manufacturing a pneumatic tire according to any one of (1) to (4), characterized in that at least the sheet made of the thermoplastic resin or the thermoplastic resin composition obtained by blending the elastomer in the thermoplastic resin is cut by using the edge tool having the non-sharp edge in such a way that a thickness T (μm) has a relationship satisfying $0.1\ t \leq T \leq 0.8\ t$ at a position inward by a length of $(t \times \frac{1}{3})$ from a tip of the sheet made of the thermoplastic resin or the thermoplastic resin composition obtained by blending the elastomer in the thermoplastic resin.

Here, t is an average thickness (μm) of the sheet made of the thermoplastic resin or the thermoplastic resin composition obtained by blending the elastomer in the thermoplastic resin (not including a portion deformed due to cutting), in the tire circumferential direction, and T is the thickness (μm) of the sheet made of the thermoplastic resin or the thermoplastic resin composition obtained by blending the elastomer in the thermoplastic resin, at the position inward by the length of $(t \times \frac{1}{3})$ from the tip of the sheet.

In the method of manufacturing a pneumatic tire of the present technology according to claim 1, a pneumatic tire can be manufactured in which the sheet of the thermoplastic resin or the thermoplastic resin composition and the tie rubber sheet cured and adhered to the sheet of the thermoplastic resin or the thermoplastic resin composition, collectively constituting the inner liner layer, are not delaminated from each other and which is thereby excellent in durability after the tire starts to be used for running.

The method of manufacturing a pneumatic tire of the present technology according to any of claims 2 to 5 has the effect of the present technology according to claim 1. In addition, this effect can be more surely and effectively obtained.

Figure 2A:
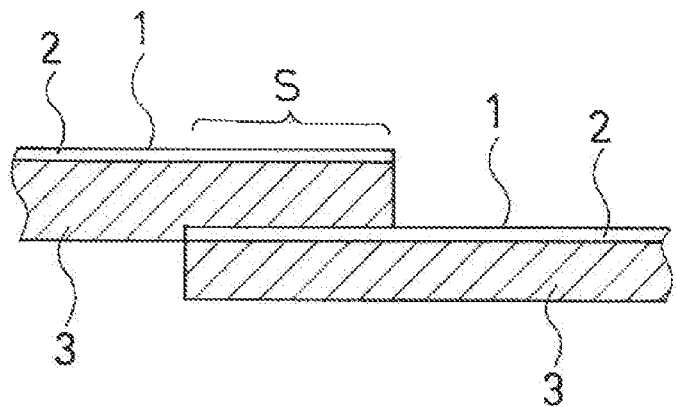
Figure 2B:
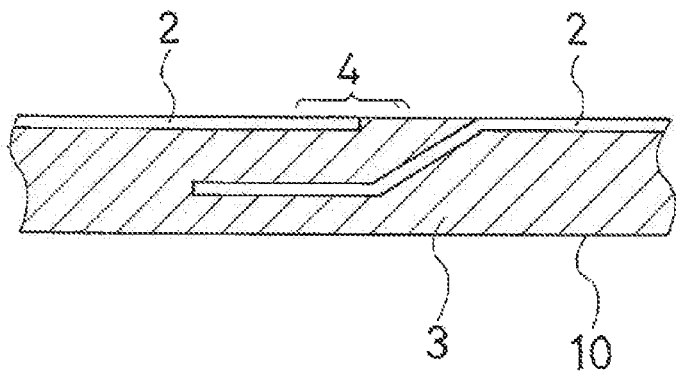

Part (a) of FIG. 2 is a view showing, as a model, the state where end portions of a laminated sheet 1 are lap-spliced, the laminated sheet 1 obtained by laminating: a sheet 2 which is cut with a sharp edge tool different from that in the method of the present technology and which is made of a thermoplastic resin or a thermoplastic resin composition; and rubber 3 which is cured and adhered to the thermoplastic resin or the thermoplastic resin composition, and Part (b) of FIG. 2 is a view showing, as a model, the state where the laminated sheet 1 is cure-molded in the state shown in Part (a) of FIG. 2.

Figure 3A:
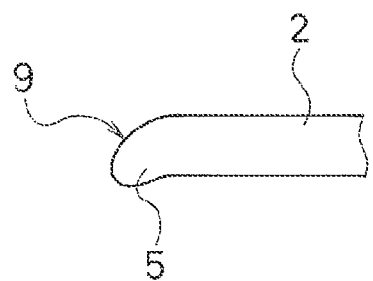
Figure 3B:
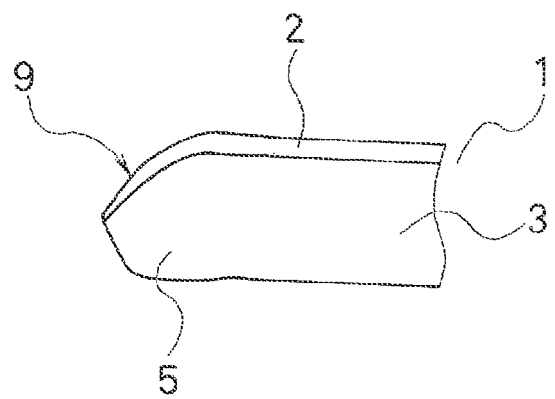

FIG. 3 is a view for explaining a method of manufacturing a pneumatic tire of the present technology, Part (a) of FIG. 3 shows, as a model, a form of a tip section 9 of the sheet 2 made of the thermoplastic resin or the thermoplastic resin composition, the tip section 9 obtained when the sheet 2 is cut into a predetermined length suitable for desired lap-splicing, and Part (b) of FIG. 3 shows, as a model, a form of the tip section 9 of the laminated sheet 1 obtained by laminating the sheet 2 made of the thermoplastic resin or the thermoplastic resin composition and the rubber 3 cured and adhered to the thermoplastic resin or the thermoplastic resin composition, the tip section 9 obtained when the laminated sheet 1 is cut into a predetermined length suitable for desired lap-splicing.

Parts (a) and (b) of FIG. 4 are each a view for explaining, as a model, an example of a shape of an edge of an edge tool having a non-sharp edge usable in the method of manufacturing a pneumatic tire of the present technology, and Parts (c) and (d) of FIG. 4 each show an example of the case where the edge tool is brought into contact with a sheet to be cut.

Figure 5:
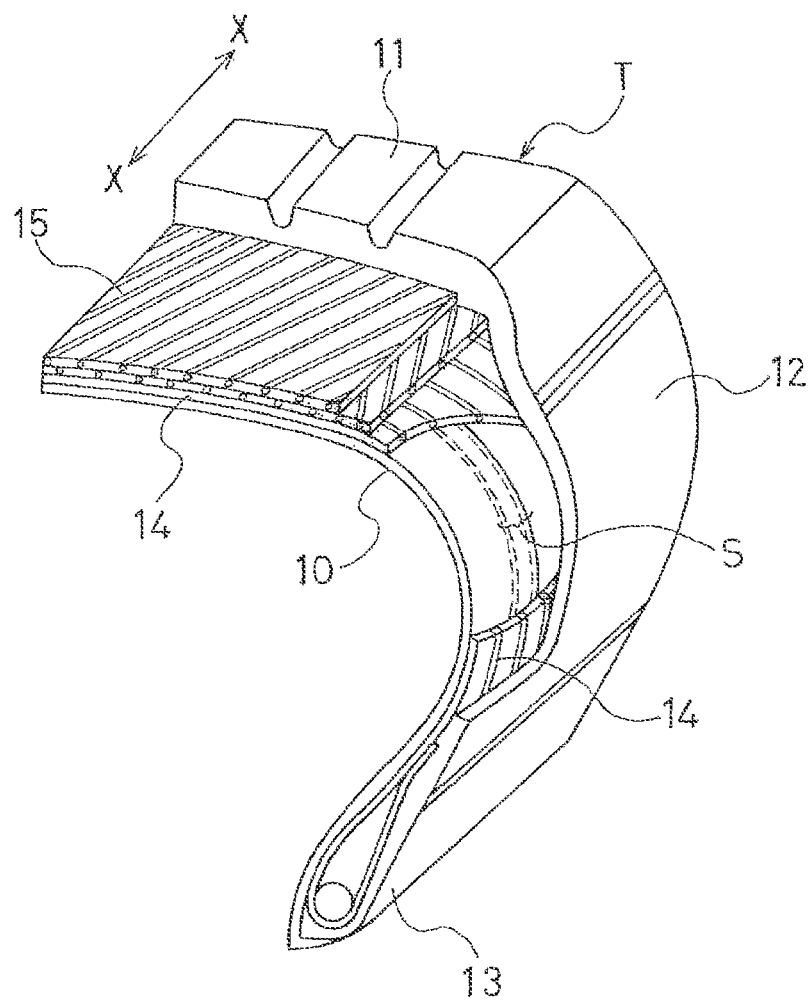

FIG. 5 is a partial cutaway perspective view showing an example of an embodiment of a pneumatic tire obtained by the method of manufacturing a pneumatic tire of the present technology.

DETAILED DESCRIPTION

A method of manufacturing a pneumatic tire of the present technology is described below in further detail.

The method of manufacturing a pneumatic tire of the present technology uses a laminated sheet 1 having a predetermined length and obtained by laminating: a sheet 2 made of a thermoplastic resin or a thermoplastic resin composition obtained by blending a thermoplastic resin and an elastomer; and rubber 3 cured and adhered to the thermoplastic resin or the thermoplastic resin composition, in which an inner liner layer 10 is formed from the laminated sheet through the step of cure-molding the tire with end portions of the laminated sheet 1 lap-spliced. The method is characterized in that, when at least the sheet 2 made of the thermoplastic resin or the thermoplastic resin composition obtained by blending the thermoplastic resin and the elastomer is cut into the predetermined length, the cutting is performed by using an edge tool having a non-sharp edge under a temperature condition not lower than 60° C. and not higher than the melting point of the thermoplastic resin.

The inventors have made findings given below, as a result of having made various studies on causes of delamination between the sheet 2 made of the thermoplastic resin or the thermoplastic resin composition obtained by blending the elastomer in the thermoplastic resin and the tie rubber sheet 3 cured and adhered to the sheet of the thermoplastic resin or the thermoplastic resin composition, which collectively constitute the inner liner layer 10, the delamination being a disadvantage of the conventional method.

Specifically, when the above-described laminated sheet 1 is prepared by a normal method, the delamination is considered to occur as follows. Around a lap-splice portion S of both ends of the laminated sheet 1 shown in Parts (a) and (b) of FIG. 2, large stress occurs in a rubber portion interposed between both end portions of the sheet 2 which are laid one on top of the other, the sheet 2 having large stiffness and made of the thermoplastic resin or the thermoplastic resin composition obtained by blending the elastomer in the thermoplastic resin. As a result, a crack develops in a vicinity 4 of tip portions or the like of the sheet 2 of the thermoplastic resin or the thermoplastic resin composition. Then, the crack becomes larger and delamination thereby occurs.

Meanwhile, in the method of manufacturing a pneumatic tire of the present technology, when the laminated sheet 1 is prepared by being cut into the predetermined length, a sheet cut by using the edge tool having the non-sharp blade under the temperature condition not lower than 60° C. and not higher than the melting point of the thermoplastic resin is used as the sheet 2 of the thermoplastic resin or the thermoplastic resin composition obtained by blending the elastomer in the thermoplastic resin, and the end portions of the sheet are lap-spliced.

Figure 1A:
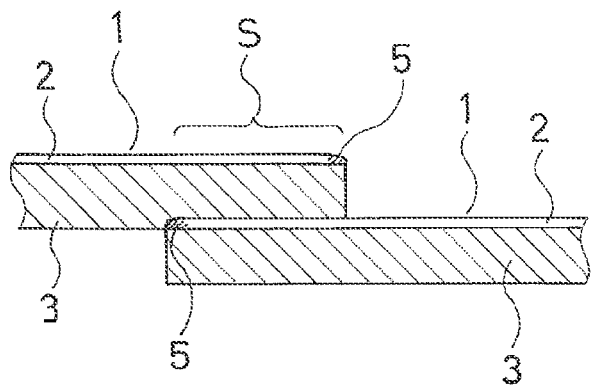
FIG. 1 is a view for explaining a method of manufacturing a pneumatic tire of the present technology, Part (a) of FIG. 1 is a view showing, as a model, the state where end portions of a laminated sheet 1 are lap-spliced, the laminated sheet 1 obtained by laminating a sheet 2 and rubber 3, the sheet 2 cut into a predetermined length, having tips processed to be tapered, and a made of a thermoplastic resin or a thermoplastic resin composition, the rubber 3 cured and adhered to the thermoplastic resin or the thermoplastic resin composition, Part (b) of FIG. 1 is a view showing, as a model, the state where the laminated sheet 1 is cure-molded in the state shown in Part (a) of FIG. 1, and Part (c) of FIG. 1 is a schematic side view for explaining, as a model, a shape of a cut tip of the sheet 2 which is made of the thermoplastic resin or the thermoplastic resin composition and which is cut by a cutting method of the present technology.
Figure 1B:
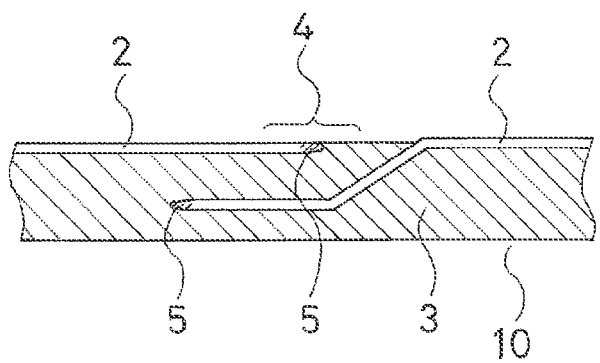
Figure 1C:
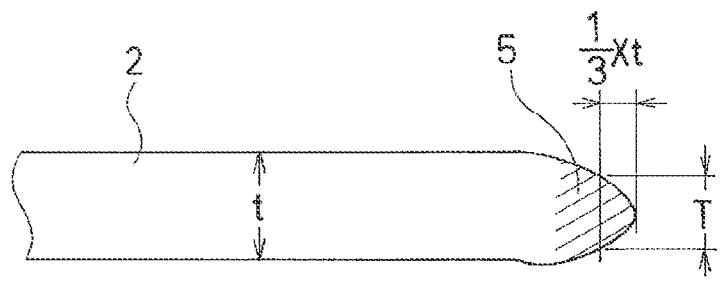

By being cut under such a condition, cut ends of the sheet 2 obtained in the method of the present technology have a following form. As shown in the models of Parts (a) and (b) of FIG. 1, the sheet 2 of the thermoplastic resin or the thermoplastic resin composition obtained by blending the elastomer in the thermoplastic resin is thin and has a sharp-edged form around tip portion 5 of the sheet 2. The stress is distributed because the sheet 2 is thin around its tips and also because the area of an interface between the sheet 2 and the rubber portion 3 is increased by making the sheet 2 thin around its tips. Due to these reasons, the stress occurring in the rubber portion 3 interposed between the end portions of the sheet 2 is small and distributed, and is thus relieved. This exerts an effect of preventing the occurrence of the phenomenon of delamination between the sheet 2 of the thermoplastic resin or the thermoplastic resin composition and the tie rubber sheet 3 cured and adhered thereto, after the tire starts to be used.

In the present technology, "cut under the temperature condition not lower than 60° C. and not higher than the melting point of the thermoplastic resin" refers to cutting performed with the temperature of at least an edge portion of the edge tool having the non-sharp edge maintained at the temperature condition. In order to maintain the temperature condition while repeatedly performing the cutting operation, it is preferable to also maintain the temperature of an atmosphere around the blade tool and the temperature of an atmosphere around the sheet to be cut at the temperature condition.

The cut temperature described above being lower than 60° C. is undesirable because the shapes of the cut end portions are uneven in many cases even if the laminated sheet is cut. Moreover, cutting at a temperature higher than the melting point, although desirable in terms of cutting, is undesirable because it is difficult to maintain stable cutting for a long time due to uneven shapes of the cut end portions, adherence of resin scraps around the edge, and the like. Cutting is performed preferably at a temperature condition not lower than a glass transition temperature and not higher than the melting point of the thermoplastic resin. The cutting can be performed evenly for a long time in a more stable cutting state by cutting at a temperature not lower than the glass transition temperature. Preferable upper limit of the value is lower than the melting point. More preferably, cutting is performed with the upper limit set to a temperature lower than the melting point by 40 to 60° C.

The cutting may be performed in such a way that the sheet 2 made of the thermoplastic resin or the thermoplastic resin composition obtained by blending the thermoplastic resin and the elastomer and the tie rubber layer 3 are cut separately and thereafter laminated together. Alternatively, the cutting may be performed in the state of the laminated sheet 1 obtained by laminating: the sheet 2 made of the thermoplastic resin or the thermoplastic resin composition obtained by blending the thermoplastic resin and the elastomer; and the tie rubber layer 3. In both cases, the following point should be considered. The cutting is performed in such a way that shapes of the cut end portions of the sheet 2 made of the thermoplastic resin or the thermoplastic resin composition obtained by blending the thermoplastic resin and the elastomer are thin and have sharp-edged forms around the tip portions 5 thereof (Parts (a) and (b) of FIG. 3 to be described later).

In the method of the present technology, the procedure of cutting the sheet 2 by using the edge tool having the non-sharp edge is preferably performed as follows. The blade tool is brought into contact with a surface of the sheet 2 from a direction perpendicular to the sheet surface and then the blade tool and/or the sheet is moved to cut the sheet 2. An even cut end shape can be obtained over the entire cut width by performing cutting as described above.

Part (a) of FIG. 3 shows, as a model, an example of a form of a tip section 9 of the sheet 2 made of the thermoplastic resin or the thermoplastic resin composition, the tip section 9 obtained when the sheet 2 is cut into a predetermined length suitable for desired lap-splicing by the cutting method described above, and shows, as a model, the form obtained by moving the edge downward from an upper portion of the drawing. The tip section 9 of the sheet 2 has a tapered shape pointed downward.

Part (b) of FIG. 3 shows, as a model, a form of the cut end obtained by cutting the laminated sheet 1 by moving the edge downward from an upper portion of the drawing, the laminated sheet 1 obtained by laminating the sheet 2 made of the thermoplastic resin or the thermoplastic resin composition and the rubber 3. The tip section 9 of the sheet 2 has a tapered shape pointed downward and extending down to the rubber layer 3.

The shape of a non-sharp edge of an edge tool 21 used suitably for the method of the present technology is not particularly limited as long as the shape thereof is not sharp. However, it is preferable to use an edge tool having such a non-sharp edge that the thickness TB of the blade at a position 0.1 mm away from the tip of the edge tool 21 is not smaller than 30 μm as shown in Part (a) of FIG. 4, or to use an edge tool having such a non-sharp edge that a tip portion of the edge has a curvature R as shown in Part (b) of FIG. 4. Regarding the angles of the edge, as shown in Part (a) of FIG. 4, it is preferable that a small edge angle θ is within a range of θ=70° to 130° and a large edge angle α is within a range of α=10° to 25°. Meanwhile, in the case of Part (b) of FIG. 4, the curvature radius R is preferably 0.02 to 0.3 mm. A blade thickness C is 1 to 3 mm in both cases.

When the cutting is performed not according to the method of the present technology, but by using an edge tool with a sharp edge, the cut ends of the sheet 2 do not have the tapered shapes pointed downward as shown in Parts (a) and (b) of FIG. 3 and cut end faces have vertical forms. As a result, it becomes difficult to obtain an effect of preventing phenomenon of delamination between the sheet 2 and the tie rubber sheet 3 cured and adhered thereto.

The edge tool 21 is preferably used as follows. As shown in Parts (c) and (d) of FIG. 4, the edge tool 21 having a sufficient width with respect to the entire width of the sheet 2 to be cut is brought into contact with the surface of the sheet 2 from a direction Y perpendicular to the sheet surface and the sheet 2 is cut by moving the edge tool 21 and/or the sheet 2. Part (c) of FIG. 4 shows the case where an edge line L is parallel to the sheet 2 while Part (d) of FIG. 4 shows the case where the edge line L has an angle inclined with respect to the sheet 2. Both cases are acceptable.

A cut end shape even over the entire cut width can be obtained by cutting the sheet 2 over the entire width thereof in one cut, from the direction Y perpendicular to the surface of the sheet 2 cut as described above.

The edge tool 21 may be an edge tool brought into contact with one surface (upper surface in the drawing) of the sheet 2 to be cut, as shown in Parts (c) and (d) of FIG. 4, or may be an edge tool brought into contact with both of upper and lower surfaces of the sheet 2 (like scissors).

The shape of the tip portion 5 of the sheet 2 which is obtained by cutting the sheet 2 is preferably as follows. As shown in Part (c) of FIG. 1, the tip portion 5 is preferably formed in such a way that, at a position inward by a length of (t×⅓) from the tip of the sheet 2, the thickness T (μm) of the sheet 2 has a relationship satisfying $0.1\ t \leq T \leq 0.8\ t$, more preferably, $0.2\ t \leq T \leq 0.6\ t$. Here, t represents the average thickness (μm) of the sheet made of the thermoplastic resin or the thermoplastic resin composition obtained by blending the elastomer in the thermoplastic resin (not including a portion deformed due to cutting), in a tire circumferential direction, while T represents the thickness (μm) of the sheet made of the thermoplastic resin or the thermoplastic resin composition obtained by blending the elastomer in the thermoplastic resin, at the position inward by the length of (t×⅓) from the tip of the sheet.

FIG. 5 is a partial cutaway perspective view showing an example of an embodiment of a pneumatic tire obtained by the method of manufacturing a pneumatic tire of the present technology.

A pneumatic tire T includes a side wall part 12 and a bead part 13 in a continuous fashion on each of the left and right sides of a tread part 11. Inside the tire, a carcass layer 14 serving as the tire's framework is provided extending in a tire widthwise direction between the left and right bead parts 13 and 13. Two belt layers 15 made of steel cords are provided on the outer circumferential side of a portion of the carcass layer 14 corresponding to the tread part 11. An arrow X indicates the tire circumferential direction. The inner liner layer 10 is disposed on the inner side of the carcass layer 14, and the lap-splice portion S thereof is present extending in the tire widthwise direction.

In the pneumatic tire obtained by the method of the present technology, the development of a crack on the tire's inner circumferential surface around the lap-splice portion S, which is likely to develop in the conventional case, is suppressed. Moreover, the development of a crack and the occurrence of delamination between the sheet 2 made of the thermoplastic resin or the thermoplastic resin composition and the tie rubber layer 3, which collectively form the inner liner layer 10, are suppressed. Thus, durability is significantly improved. A length of overlap of the lap-splice portion S is of the order of preferably 7 to 20 mm, or more preferably 8 to 15 mm, depending on the tire size. The reason for this is that too long a length of overlap tends to lead to deterioration of tire's uniformity, whereas too short a length of overlap may cause the splice portion to be opened at the time of molding and is thereby undesirable.

Examples of the thermoplastic resin usable preferably in the present technology include: polyamide-based resins [for example, nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6 (MXD6), nylon 6T, nylon 9T, nylon 6/6T copolymers, nylon 66/PP copolymers, and nylon 66/PPS copolymers]; their N-alkoxyalkylates, for example, methoxymethylated nylon 6, methoxymethylated nylon 6/610 copolymers, and methoxymethylated nylon 612; polyester-based resins [for example, aromatic polyesters such as polybutylene terephthalate (PBT), polyethylene terephthalate (PET), polyethylene isophthalate (PEI), PET/PEI copolymers, polyarylate (PAR), polybutylene naphthalate (PBN), liquid crystal polyester, and polyoxyalkylene diimide diacid/polybutylene terephthalate copolymers]; polynitrile-based resins [for example, polyacrylonitrile (PAN), polymethacrylonitrile, acrylonitrile/styrene copolymers (AS), (meth)acrylonitrile/styrene copolymers, and (meth)acrylonitrile/styrene/butadiene copolymers]; polymethacrylate-based resins [for example, polymethyl methacrylate (PMMA) and polyethylmethacrylate]; polyvinyl-based resins [for example, vinyl acetate, polyvinyl alcohol (PVA), vinyl alcohol/ethylene copolymers (EVOH), polyvinylidene chloride (PVDC), polyvinyl chloride (PVC), vinyl chloride/vinylidene chloride copolymers, vinylidene chloride/methyl acrylate copolymers, and vinylidene chloride/acrylonitrile copolymers (ETFE)]; cellulose-based resins [for example, cellulose acetate and cellulose acetate butyrate]; fluororesins [for example, polyvinylidene fluoride (PVDF), polyvinyl fluoride (PVF), polychlorofluoroethylene (PCTFE), and tetrafluoroethylene/ethylene copolymers]; imide-based resins [for example, aromatic polyimide (PI)]; and the like.

Moreover, any of the resins described above is usable as the thermoplastic resin out of the thermoplastic resin and the elastomer which constitute the thermoplastic resin composition usable in the present technology. Meanwhile, examples of the preferably-usable elastomer include: diene rubbers and their hydrogenated products [for example, natural rubbers (NR), isoprene rubber (IR), epoxidized natural rubbers, styrene-butadiene rubber (SBR), butadiene rubbers (BR, high-cis BR and low-cis BR), nitrile rubber (NBR), hydrogenated NBR, and hydrogenated SBR]; olefin-based rubbers [for example, ethylene propylene rubbers (EPDM and EPM), maleic acid-modified ethylene propylene rubber (M-EPM), butyl rubber (IIR), copolymers of isobutylene and aromatic vinyl or diene monomer, acrylic rubber (ACM), and ionomers]; halogen-containing rubbers [for example, Br-IIR, Cl-IIR, brominated isobutylene-co-para-methylstyrene copolymers (BIMS), chloroprene rubber (CR), hydrin rubber (CHR), chlorosulfonated polyethylene rubber (CSM), chlorinated polyethylene rubber (CM), and maleic acid-modified chlorinated polyethylene rubber (M-CM)]; silicone rubbers [for example, methyl vinyl silicone rubber, dimethyl silicone rubber, and methylphenylvinyl silicone rubber]; sulfur-containing rubbers [for example, polysulfide rubber]; fluororubbers [for example, vinylidene fluoride-based rubbers, fluorine-containing vinyl ether-based rubbers, tetrafluoroethylene-propylene-based rubbers, fluorine-containing silicone-based rubbers, and fluorine-containing phosphazene-based rubbers]; thermoplastic elastomers [for example, styrene-based elastomers, olefin-based elastomers, ester-based elastomers, urethane-based elastomers, and polyamide-based elastomers]; and the like.

At the time of blending in a combination of a specific one of the above-mentioned thermoplastic resins and a specific one of the above-mentioned elastomers, an appropriate compatibilizer may be used as a third component to make the thermoplastic resin and the elastomer compatible with each other if they are incompatible with each other. The interfacial tension between the thermoplastic resin and the elastomer decreases when such a compatibilizer is mixed in the blend system. As a result, the size of elastomer particles constituting the dispersion phase becomes finer. Accordingly, these two components exhibit their characteristics more effectively. In general, such a compatibilizer may have a copolymer structure including both or either of a structure of the thermoplastic resin and a structure of the elastomer, or a copolymer structure including an epoxy group, a carbonyl group, a halogen group, an amino group, an oxazoline group, a hydroxyl group, or the like, which is capable of reacting with the thermoplastic resin or the elastomer. Such a compatibilizer may be selected depending on the types of the thermoplastic resin and the elastomer with which the compatibilizer is blended. Examples of the compatibilizer normally used include: styrene/ethylene-butylene-styrene block copolymers (SEBS) and their maleic acid-modified products; EPDM; EPM; EPDM/styrene or EPDM/acrylonitrile graft copolymers and their maleic acid-modified products; styrene/maleic acid copolymers; reactive phenoxine; and the like. The blending proportion of such a compatibilizer is not particularly limited, yet the blending proportion is preferably 0.5 to 10 parts by weight per 100 parts by weight of the polymer components (the total amount of the thermoplastic resin and the elastomer).

In the thermoplastic resin composition obtained by blending a thermoplastic resin and an elastomer, the composition ratio of the specific thermoplastic resin to the specific elastomer is not particularly limited. This composition ratio may be set as appropriate in order that the thermoplastic resin composition can have a structure in which the elastomer is dispersed as a discontinuous phase in the matrix of the thermoplastic resin. This composition ratio is preferably in a range of 90/10 to 30/70 in weight ratio.

In the present technology, the thermo plastic resin or the thermoplastic resin composition obtained by blending the thermoplastic resin and the elastomer may be mixed with other polymers such as the compatibilizer, as long as the other polymers do not impair the characteristics needed for the inner liner. The purposes of mixing such other polymers are to improve the compatibility between the thermoplastic resin and the elastomer, to improve molding processability of the materials, to improve heat resistance, to reduce costs, and so on. Examples of materials used for such other polymers include polyethylene (PE), polypropylene (PP), polystyrene (PS), ABS, SBS, polycarbonate (PC), and the like. In addition, a filler (calcium carbonate, titanium oxide, alumina, or the like) generally blended in the polymer blend, a reinforcing agent such as carbon black and white carbon, a softener, a plasticizer, a processing aid, a pigment, a dye, an antioxidant, and the like may be blended optionally as long as the blended materials do not impair the characteristics needed for the inner liner.

The thermoplastic resin composition has a structure in which the elastomer is dispersed as a discontinuous phase in the matrix of the thermoplastic resin. Having such a structure, this thermoplastic resin composition can provide the inner liner both with sufficient flexibility and with sufficient stiffness based on the effect of a resin layer as a continuous phase. At the same time, when this thermoplastic resin composition is molded, the thermoplastic resin composition can achieve the molding processability equivalent to that of the thermoplastic resin, regardless of the amount of the elastomer.

The Young's modulus of each of the thermoplastic resin and the elastomer usable in the present technology is not particularly limited, yet is set preferably to 1 to 500 MPa and more preferably to 50 to 500 MPa.

EXAMPLES

Hereinbelow, the method of manufacturing a pneumatic tire of the present technology will be specifically described with reference to examples.

Note that evaluation of pneumatic tire was performed by observing development of a crack and occurrence of delamination around the splice portion of the inner liner layer in the cavity of each of test tires and also by comparing these conditions with those in other portions.

As each test tire, a tire of 215/70R15 98H was used. Two tires were prepared for each of Examples and Comparative Examples. Each tire was mounted on a standard rim 15X6.5JJ specified in JATMA (Japan Automobile Tire Manufacturers Association), and a tire inflation pressure was set to a maximum inflation pressure (240 kPa) specified in JATMA.

Examples 1 and 2 and Comparative Examples 1 and 2

In each of Example 1 and Comparative Example 1, a thermoplastic resin sheet having a thickness of 130 µm and made of a N6/66 copolymer was used as the sheet of the thermoplastic resin or the thermoplastic resin composite which constitutes the inner liner layer.

Likewise, in each of Example 2 and Comparative Example 2, a sheet having a thickness of 130 µm and made of a thermoplastic resin composition was used, the thermoplastic resin composition obtained by blending a N6/66 copolymer as a thermoplastic resin and BIMS as the elastomer at a ratio of 50 to 50 as shown in Table 1.

All of the used N6/66 copolymers have a melting point of 195° C.

The single sheet of each of Examples 1 and 2 was cut into a predetermined length from the perpendicular direction as in the case of the laminated sheet shown in Part (c) of FIG. 4, under a temperature condition of 130° C., by using a non-sharp edge of an edge tool whose blade had a thickness of 0.3 mm at a point 0.1 mm away from the edge.

The single sheet of each of Comparative Examples 1 and 2 was cut into a predetermined length from the perpendicular direction as shown in Part (c) of FIG. 4, under the temperature condition of 130° C., by using an edge tool having an edge with sharp finish.

Portions around cut end faces of the sheets of Examples 1 and 2 and Comparative Examples 1 and 2 were observed with an optical microscope. In Example 1, t was 130 μm while T was 40 μm. In Example 2, t was 130 μm while T was 50 μm. In a product of each of Comparative Examples 1 and 2, the cut end face at the tip of the product had a shape with an edge perpendicular to a sheet plane direction.

Then, adhesive tie rubber having thickness of 0.7 mm and having a composition shown in Table 2 was laminated to each of the sheets of Examples 1 and 2 and Comparative Examples 1 and 2. Thereafter, each of the sheets was lap-spliced with an overlap length of 10 mm on the tire making drum. Otherwise, the same method as a normal tire cure-molding method was used and the pneumatic tires having the specifications described above were manufactured.

After running of a distance of 50,000 km under a load of 7.35 kN, each of the test tires was examined for the presence or absence of development of a crack and occurrence of delamination around the splice portion of the inner liner layer in the cavity of the test tire and these conditions were also compared to those in other portions.

As a result, in each of the products of Comparative Examples 1 and 2, after the running of a distance of 3,000 km, a crack was developed around the splice portion, and further, after running of an accumulated distance of 20,000 km, the crack grew into delamination between the thermoplastic resin sheet and the tie rubber. At that point in time, no particular problem occurred in portions other than around the splice portion and the other portions were in good condition.

Meanwhile, in each of the products of Examples 1 and 2 of the present technology, even after the running of a distance of 50,000 km, no particular problem occurred around the splice portion and in other portions.

Examples 3 and 4 and Comparative Examples 3 and 4

In each of Example 3 and Comparative Example 3, a thermoplastic resin sheet having a thickness of 130 μm and made of a N6/66 copolymer was used as the sheet of the thermoplastic resin or the thermoplastic resin composite which constitutes the inner liner layer.

Likewise, in each of Example 4 and Comparative Example 4, a sheet having a thickness of 130 μm and made of a thermoplastic resin composition was used, the thermoplastic resin composition obtained by blending a N6/66 copolymer as a thermoplastic resin and BIMS as the elastomer at a ratio of 50 to 50 as shown in Table 1.

All of the used N6/66 copolymers have a melting point of 195° C.

Rubber having a thickness of 0.7 mm and having a composition shown in Table 2 was used as the adhesive tie rubber which likewise constitutes the inner liner layer. A laminated sheet obtained by laminating the sheet of the thermoplastic resin or the thermoplastic resin composition and the tie rubber layer was prepared by being wound into a rolled shape.

When the laminated sheet was lap-spliced and wound around a tire making drum, the laminated sheet was cut into a desired length as follows in Examples 3 and 4. The laminated sheet was cut into a predetermined length from the perpendicular direction as shown in Part (c) of FIG. 4, under a temperature condition of 130° C., by using a non-sharp edge of an edge tool whose blade had a thickness of 0.3 mm at a point 0.1 mm away from the edge.

The laminated sheet of each of Comparative Examples 3 and 4 was cut into a predetermined length from the perpendicular direction as shown in Part (c) of FIG. 4, under the temperature condition described above, by using an edge tool having an edge with sharp finish.

Portions around cut end faces of the laminated sheets of Examples 3 and 4 and Comparative Examples 3 and 4 were observed with an optical microscope. In Example 3, t was 130 μm while T was 30 μm. In Example 4, t was 130 μm while T was 40 μm. In a product of each of Comparative Examples 3 and 4, the cut end face at the tip of the product had a shape with an edge perpendicular to a sheet plane direction.

Each of the laminated sheets was lap-spliced with an overlap length of 10 mm on the tire making drum. Otherwise, the same method as a normal tire cure-molding method was used and the pneumatic tires having the specifications described above were manufactured.

After running of a distance of 50,000 km under a load of 7.35 kN, each of the test tires was examined for the presence or absence of development of a crack and occurrence of delamination around the splice portion of the inner liner layer in the cavity of the test tire and these conditions were also compared to those in other portions.

As a result, in each of the products of Comparative Examples 3 and 4, after the running of a distance of 3,000 km, a crack was developed around the splice portion, and further, after running of an accumulated distance of 20,000 km, the crack grew into delamination between the thermoplastic resin sheet and the tie rubber. At that point in time, no particular problem occurred in portions other than around the splice portion and the other portions were in good condition.

Meanwhile, in each of the products of Examples 3 and 4 of the present technology, even after the running of a distance of 50,000 km, no particular problem occurred around the splice portion and in other portions.

TABLE 1

| | | Part by mass |
|---|---|---|
| BIMS[a] | "Exxpro 3035" available from Exxon Mobil Chemical Corporation | 100 |
| Zinc oxide | "Zinc white No. 3" available from Seido Chemical Industry Co., Ltd. | 0.5 |
| Stearic acid | Stearin | 0.2 |
| Zinc stearate | "Zinc stearate" available from NOF Corporation | 1 |
| N6/66 | "UBE NYLON 5033B" available from Ube Industries, Ltd. | 100 |

TABLE 1-continued

| | | Part by mass |
|---|---|---|
| Modified EEA[b] | "HPR-AR201" available from DuPont-Mitsui Polychemicals Co., Ltd. | 10 |

Remarks:
[a] Brominated isobutylene-co-para-methylstyrene copolymer
[b] Maleic anhydride modified ethylene-ethyl acrylate copolymer

TABLE 2

| | | Part by mass |
|---|---|---|
| Styrene-butadiene rubber | "Nipol 1502" available from ZEON Corporation | 50 |
| Natural rubber | SIR-20 | 50 |
| Carbon black | "SEAST V" available from Tokai Carbon Co., Ltd. | 60 |
| Stearic acid | Stearin | 1 |
| Aromatic oil | "Desolex No. 3" available from Showa Shell Sekiyu K.K. | 7 |
| Zinc oxide | "Zinc white No. 3" available from Seido Chemical Industry Co., Ltd. | 3 |
| Modified resorcinol formaldehyde condensate | "Sumikanol 620" available from Taoka Chemical Company, Limited | 2 |
| Methylene donor | Modified etherified methylol melamine "Sumikanol 507AP" available from Taoka Chemical Company, Limited | 6 |
| Sulfur | 5% oil extended sulfur | 6 |
| Vulcanization accelerator | di-2-benzothiazole disulfide "Nocceler DM" available from Ouchi Shinko Chemical Industrial Co., Ltd. | 2.2 |

The invention claimed is:

1. A method of manufacturing a pneumatic tire which uses a laminated sheet having a predetermined length and is obtained by laminating a thermoplastic sheet, made of a thermoplastic resin composition obtained by blending a thermoplastic resin and an elastomer, to a rubber sheet which is cured and adhered to the thermoplastic resin composition in the tire, and in which an inner liner layer of the tire is formed from the laminated sheet through a step of cure-molding the tire with end portions of the laminated sheet lap-spliced, the method characterized in that when the thermoplastic sheet is cut into the predetermined length, the cutting is performed by using an edge tool having a non-sharp edge under a temperature condition not lower than 60° C. and lower than a melting point of the thermoplastic resin, wherein the edge tool having the non-sharp edge has:

a first tapered portion which extends from a non-tapered portion of the edge tool, the non-tapered portion having a thickness of from 1 to 3 mm and linear tapered walls of the first tapered portion defining an angle $\Theta$ of from 10° to 25° between one another and tapering to a second tapered portion;

the second tapered portion, which extends from the first tapered portion to a rounded tip of the edge tool, with linear tapered walls of the second tapered portion defining an angle $\alpha$ of from 70° to 130° between one another and ending at the rounded tip; and the rounded tip attached to the second tapered portion and possessing a radius of curvature of from 0.02 to 0.3 mm;

wherein the laminated sheet is cut by bringing the edge tool into contact with a surface of the thermoplastic sheet linearly from a direction perpendicular to the surface of the thermoplastic sheet so that a shaped cut surface is created in the thermoplastic sheet such that a thickness T (μm) of the shaped cut surface has a relationship satisfying $0.1t \leq T \leq 0.8t$ at a position inward in a tire circumferential direction by a length of $(t \times \frac{1}{3})$ from a tip of the thermoplastic sheet, where t is an average thickness (μm) of the thermoplastic sheet (not including a portion deformed due to cutting).

2. The method of manufacturing a pneumatic tire according to claim 1, wherein the thickness T has a relationship satisfying $0.2t \leq T \leq 0.6t$.

3. The method of manufacturing a pneumatic tire according to claim 1, wherein the end portions of the laminated sheet are lap-spliced with an overlap of from 7 to 20 mm.

4. The method of manufacturing a pneumatic tire according to claim 1, wherein the end portions of the laminated sheet are lap-spliced with an overlap of from 8 to 15 mm.

* * * * *